US012320183B2

(12) United States Patent
Roesner et al.

(10) Patent No.: US 12,320,183 B2
(45) Date of Patent: Jun. 3, 2025

(54) PRESSURE AND IMPACT RESISTANT SECTIONAL DOOR

(71) Applicant: Assa Abloy Entrance Systems AB, Landskrona (SE)

(72) Inventors: Stephen Anthony Roesner, Lawrence, KS (US); Michael Alan Drach, Lawrence, KS (US)

(73) Assignee: Assa Abloy Entrance Systems AB, Landskrona (SE)

(*) Notice: Subject to any disclaimer, the term of this patent is extended or adjusted under 35 U.S.C. 154(b) by 0 days.

(21) Appl. No.: 18/102,328

(22) Filed: Feb. 24, 2023

(65) Prior Publication Data

US 2023/0220722 A1 Jul. 13, 2023

Related U.S. Application Data

(62) Division of application No. 17/205,893, filed on Mar. 18, 2021, now Pat. No. 11,591,845.

(51) Int. Cl.
*E06B 3/964* (2006.01)
*E06B 3/58* (2006.01)
(Continued)

(52) U.S. Cl.
CPC .............. *E06B 3/5892* (2013.01); *E06B 3/70* (2013.01); *E06B 5/12* (2013.01); *E06B 2003/7044* (2013.01)

(58) Field of Classification Search
CPC ............. E06B 3/5892; E06B 3/70; E06B 5/12
See application file for complete search history.

(56) References Cited

U.S. PATENT DOCUMENTS 3,844,084 A * 10/1974 Hubbard .............. B62D 33/044 52/843
4,048,755 A * 9/1977 Wolak ................. E05D 15/1007 49/225

(Continued)

OTHER PUBLICATIONS

John E. Scates, P.E., Haas Door, A Noftiger Company, 10' 2" Extruded Aluminum Series Wind Load Sectional Door Design Pressure, Impact Resistant, May 29, 2018, pp. 1-3.

(Continued)

*Primary Examiner* — Basil S Katcheves
(74) *Attorney, Agent, or Firm* — Wissing Miller LLP

(57) ABSTRACT

Disclosed is a sectional door adapted to withstand high wind load and impact from flying debris. The door includes a glazing bead to secure glazing panels into frames formed by the rails and stiles of the door. The bead is connected with the frame by engagement between extensions on the bead and respective lips along the edges of the frame. The bead is pressed against the frame, causing the extension to elastically flex to allow the extensions to fit between the lips. The extensions are received in gaps formed by the lips to secure the bead in place on the frame. Force on the door cause by high winds is communicated from the glazing panel through the bead and to the frame. The door also includes reinforcements arranged along the rails to communicate forces, such as high wind load forces, from the frame to the edges of the doorway surrounding the door. The reinforcements include endcaps that increase stiffness of the rails to prevent the rails from buckling during severe weather events.

12 Claims, 12 Drawing Sheets

(51) Int. Cl.
*E06B 3/70* (2006.01)
*E06B 5/12* (2006.01)

(56) References Cited

U.S. PATENT DOCUMENTS

| | | | | | |
|---|---|---|---|---|---|
| 4,856,126 | A * | 8/1989 | Baus | A47K 3/36<br>4/612 |
| 6,170,897 | B1 * | 1/2001 | Karrer | B60R 11/00<br>296/39.2 |
| 6,517,056 | B2 * | 2/2003 | Shepherd | E04F 11/1851<br>256/65.01 |
| 6,837,011 | B2 | 6/2005 | Berger, Jr. | |
| 7,963,077 | B2 * | 6/2011 | Lin | E06B 3/72<br>52/204.597 |
| 8,201,367 | B2 | 6/2012 | Barnard et al. | |
| 10,549,955 | B2 * | 2/2020 | Zappa | B66B 13/301 |
| 11,060,341 | B1 * | 7/2021 | Sprague | E06B 3/549 |
| 11,187,323 | B2 * | 11/2021 | Sprague | F16J 15/0818 |
| 11,299,928 | B2 * | 4/2022 | Sprague | E06B 3/72 |
| 2008/0271960 | A1 * | 11/2008 | Michaels | B66B 13/30<br>187/334 |
| 2018/0080272 | A1 * | 3/2018 | Fujishin | E06B 1/6084 |
| 2021/0381305 | A1 * | 12/2021 | Sprague | E06B 3/02 |

OTHER PUBLICATIONS

G. Taylor, Overhead Door, Oct. 20, 2014, p. 1.

* cited by examiner

PRESSURE AND IMPACT RESISTANT SECTIONAL DOOR

This application is a divisional of U.S. patent application Ser. No. 17/205,893, filed on Mar. 18, 2021, now U.S. Pat. No. 11,91,845, issued on Feb. 28, 2023, the disclosure of which is incorporated herein by reference.

BACKGROUND

Field

The present disclosure relates to sectional doors designed to resist high wind loads and impact from flying objects during storm events. In particular, the present disclosure is directed to sectional doors that include a glazing bead that distributes pressure and impact load from glazing panels to the frame of the door. In addition, the present disclosure is directed to sectional doors that include reinforcing members affixed to rails and/or stiles of the door frame to absorb forces when the door is subject to high wind pressure.

Description of the Related Art

Sectional doors are used to cover openings in structures that open and close easily. For example, garage doorways are typically provided with sectional doors that can be raised and lowered to open and close the garage. Such doors often include glazing panels to allow light to enter the building and to provide persons within the building with a view outside. In some cases, sectional doors are provided with glazing panels across all, or substantially all, of the door area. This arrangement provides significant light into the building and creates an aesthetically pleasing architectural effect, potentially making the space within the building feel larger and more open.

Sectional doors are formed from interconnected panels. Each panel has a top and bottom rail running horizontally and a plurality of vertical stiles connecting the rails with one and another. The rails and stiles form a door frame with square or rectangular openings to hold transparent glazing panels. A glazing bead may be provided around the perimeter of each glazing panel to secure it within the opening.

The openings of the frame may include a stop around the perimeter of the opening. One face of the glazing panel is held against the stop. The opposite face of the glazing panel is contacted by the glazing bead, which presses the glazing panel against the stop and holds the panel within the opening of the frame. A sealant or glazing tape may be provided between the glazing panel and the stop to form a weather-tight connection between the glazing panel and the frame. The glazing bead is typically connected with the frame around the opening surrounding the glazing panel with fasteners, such as screws or bolts.

When force is applied to the faces of the gazing panel, for example, by an inward or outward pressure differential across the door during a storm event, that force is communicated from the glazing panel to the frame by the contact between the glazing panel and the stop in one direction and between the glazing panel and the glazing bead in the other direction.

Building components, such as sectional doors, must generally comply with local building codes. In some regions, these codes specify the strength of structures, such as doors, to resist damage when exposed to high winds. Manufacturers of construction products and assemblies must provide assurance to government officials that their products comply with these requirements in order to sell their products in these regions. For example, the building code in Miami-Dade County in Florida includes stringent wind resistance requirements to minimize damage during hurricane events. Very often, doors are specially designed to be sold in hurricane prone regions like the Florida coast.

The engagement of the glazing bead and the door frame must be sufficiently strong so that the glazing panels are not dislodged during a weather event, such as a hurricane. To provide sufficient strength, known glazing beads rely on robust components to engage the frame and glazing panel. Multiple fasteners, such as screws or bolts may be used to secure the bead with the frame. Covers may be provided over the heads of the fasteners to protect them from corrosion and to improve the aesthetic appearance of the door. Robust glazing beads, fasteners, and fastener covers may extend inward from the frame and obscure the area covered by the glazing panel, reducing the amount of light admitted by the panel and obstructing the view through the panel.

Connecting the glazing bead with the door frame using fasteners may add complexity and cost to the process for assembling a sectional door. A sectional door may include dozens of glazing panels. Each glazing panel is supported along four sides with each side supported by a separate segment of glazing bead. Connecting these glazing bead segments to the frame on a typical door may require inserting hundreds of fasteners.

In addition to providing a strong connection between glazing panels and the door frame of sectional doors to withstand storm events, the frame itself must have sufficient stiffness so that it will not buckle away from the doorway when the door is subject to the force of storm winds. To protect buildings during storm events, it is important that openings, such as doorways, remain sealed from wind and external pressure. If an opening were to develop during a high wind event, for example, because the door frame flexes away from the walls surrounding the doorway, inrushing air could pressurize the interior of the building. This situation could lead to catastrophic failure of the door or other building components.

To improve the stiffness of sectional doors subject to severe weather events, the rails of such doors may include stiffening members. These stiffening members typically run across the face of the door parallel with the horizontal rails. Where these stiffening members cross the openings holding the glazing panels, the members may block light and obstruct the view through the panels.

Thus, there is a need for an improved sectional door that provides a high strength glazing bead that is less complex to install than known glazing beads and that does not obstruct openings covered by glazing panels. There is also a need for a sectional door that includes strengthening members that provide sufficient stiffness to the door to minimize flexing of the door during a severe weather event.

SUMMARY

The present disclosure relates to apparatuses and methods to address these and other difficulties.

According to one aspect of the disclosure, there is provided a glazing bead that secures glazing panels to the frame of a sectional door and that distributes wind load forces and the force of impacts from flying debris from the panel to the frame.

According to another aspect, the bead absorbs inwardly directed force against the panel and transfers that force to the frame substantially along a major axis of the bead. Force directed along the axis of the bead exerts very little torque on the bead that might otherwise dislodge the bead from the frame.

According to another aspect, the bead includes a notch-engaging arm that extends into a notch formed along the periphery of the glazing panel. Engagement of the arm with the notch prevents the edge of the glazing panel from pulling away from the frame as the panel flexes in response to wind load and impact forces.

According to another aspect, engagement between the bead and the frame is formed by a snap-fit between engagement extensions on the glazing bead and lips on the frame. This snap-fit engagement allows glazing panels to be assembled onto a door section according to embodiments of the disclosure without the need to insert fasteners, such as screws or bolts.

According to another aspect, there is provided a sectional door adapted to resist high wind loads and flying debris that might be encountered during a severe weather event. The door is formed from rails that extend across the width of the door. The rails are connected by stiles to form frames to receive panels, such as glazing panels. One or more of the rails includes a reinforcement that runs along at least a part of the length of the rail. The reinforcement includes an endcap that can be joined with the reinforcement to improve the stiffness of the rail to prevent the door from buckling during a severe weather event.

According to one embodiment, there is provided a door frame formed by a plurality of rails and stiles that form one or more frames to hold glazing panels. The panels are secured to the frame by a glazing bead. The bead includes an abutment that presses the glazing panel against a stop formed by the frame to secure the panel in place. The bead includes two extensions that fit between and engage with inward-facing and outward-facing lips on the frame. At least one of the extensions flexes to allow the extensions to fit between the lips. The extensions are at least partially received in gaps formed by the lips. Elastic tension on the extensions holds them in engagement with the lips to secure the bead with the frame.

According to one embodiment, there is provided a glazing bead for securing a glazing panel in a frame, comprising a glazing bead body disposed on a first side of the panel, wherein the body comprises an abutment adapted to contact a surface on the first side of the panel, a first engagement extension connected with the body and adapted to engage with a first lip of the frame, and a second engagement extension connected with the body at a position inward from the first engagement extension, the second engagement extension adapted to engage with a second lip of the frame. An inward facing surface of the second engagement extension abuts an outward facing surface of the second lip, inwardly directed force on the glazing panel is communicated to the body by contact with the abutment, and the inwardly directed force is communicated to the frame by the second engagement extension in contact with the second lip. The glazing bead may further comprise an arm extending from the body and adapted to engage with a notch on the first side of the panel. The first engagement extension may comprise a resilient portion, wherein deflection of the resilient portion presses the first engagement extension in the outward direction against the first lip and presses the second extension in the inward direction against the second lip. The first lip of the frame may form a first gap and the second lip of the frame may form a second gap, wherein the first extension engages with the first gap and the second extension engages with the second gap, and wherein the deflection of the resilient portion forces the first extension into the first gap and forces the second extension into the second gap. A frameward-directed force applied to the body when the bead is not engaged with the frame may cause the resilient portion to deflect, allowing the first extension to extend into the first gap and allowing the second portion to extend into the second gap, wherein the bead is connected with the frame by a snap-fit engagement. The body may comprise a major axis and the abutment may be arranged along the major axis. The glazing bead may further comprise one or more fasteners joining the body of the glazing bead with the frame.

According to another embodiment, there is provided a door comprising a plurality of rails, a plurality of stiles, wherein the stiles connect adjacent ones of the rails to form a frame, a glazing panel fitted within the frame, wherein the panel comprises an inward facing surface and an outward facing surface, and a glazing bead connected with the frame, wherein the glazing bead secures the panel in the frame. The frame comprises a stop along a perimeter of the frame at an outward side of the frame, wherein the outward facing surface of the glazing panel is in contact with an inward facing surface of the stop, a first lip along the perimeter of the frame, the first lip positioned inward from the stop, and a second lip along the perimeter of the frame, the second lip positioned inward from the first lip. The glazing bead comprises a glazing bead body, an abutment at an outermost end of the body, wherein the abutment is positioned in contact with the inward facing surface of the panel and wherein the glazing panel is secured in the frame by contact with the stop and the abutment, a first engagement extension extending from the body and engaging with the first lip, and a second engagement extension extending from the body and engaging with the second lip, wherein an inward facing surface of the second engagement extension abuts an outward facing surface of the second lip, wherein inwardly directed force on the glazing panel is communicated to the body by contact with the abutment, and wherein the inwardly directed force is communicated to the frame by the second engagement extension in contact with the second lip. The glazing panel may comprise a notch on the inward facing surface of the panel along a perimeter of the panel, and the glazing bead body may comprise a notch engaging arm where the arm extends from the body and engages in the notch. The first engagement extension may contact an inward-facing surface of the first lip and engagement of the first engagement extension with the first lip and engagement of the second engagement extension with the second lip may secure the glazing bead with the frame. The first engagement extension may comprise a resilient portion and deflection of the resilient portion may force the first engagement extension against the first lip and may force the second engagement extension against the second lip. The frame may further comprise a first gap formed by the first lip and a second gap formed by the second lip, wherein the first engagement extension is received in the first gap and wherein the second engagement extension is received in the second gap. A force applied to the panel in the outward direction may be communicated from the panel to the frame by contact of the panel with the stop. The door may further comprise one or more reinforcements connected, respectively, with one or more of the rails, wherein the reinforcement extends parallel with the rail across at least a portion of a width of the door, and wherein the reinforcement comprises an endcap. The door may comprise a plurality of flanges along an inward-facing edge of the reinforcement that engage with a respective plurality of gaps along an outward-facing edge of the endcap. The door may further comprise two pulleys, the pulleys arranged at opposite ends of at least one of the plurality of rails, two tracks, the tracks arranged along opposite edges of a doorway. The pulleys at ends of the at least one rail engage with respective ones of the tracks to connect the edges of the door with the doorway. An inward force exerted on the glazing panel is communicated to the frame by the glazing bead. The inward force is communicated from the frame to the rails, the inward force is communicated from the rails to the tracks, and the reinforcement and endcap resist deflection of the door by the inward force.

According to one embodiment, there is provided a reinforced member for a door, the member comprising a rail extending across a width of the door, a reinforcement arranged parallel with the rail, wherein a first edge of the reinforcement is connected with the rail, wherein the reinforcement extends along the rail at least partially across the width of the door, and wherein the reinforcement comprises one or more engagement flanges parallel with the rail and running along a second edge of the reinforcement opposite from the first edge, and an endcap connected with the second edge of the reinforcement and arranged parallel with the reinforcement, wherein the endcap comprises a plurality of gaps along a first edge of the endcap, wherein the engagement flanges of the reinforcement are received into the gaps to connect the endcap with the reinforcement.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

As discussed above, components of buildings must generally comply with local building codes. In regions of the world where high-wind events such as hurricanes are more frequent, building codes often require that structures be able to withstand forces expected during such events. Structures such as sectional doors may be required to withstand specified minimum forces exerted by wind or by pressure differentials between the interior and exterior of the building to meet the code. For example, a door may be required to withstand a certain number of pounds per square foot (PSF). The actual force exerted on the door will depend on the area of the door panel. Thus, the strength of the door may set a limit on the area of the door.

For purposes of the disclosure, the terms "distal," "outward," "outward-facing" and "in an outward direction" refer to the direction from the interior of the building through the door toward the exterior of the building. The terms "proximal," "inward," "inward-facing," and "in an inward direction" refer to the direction from the exterior of the building through the door toward the interior of the building.

Figure 1:
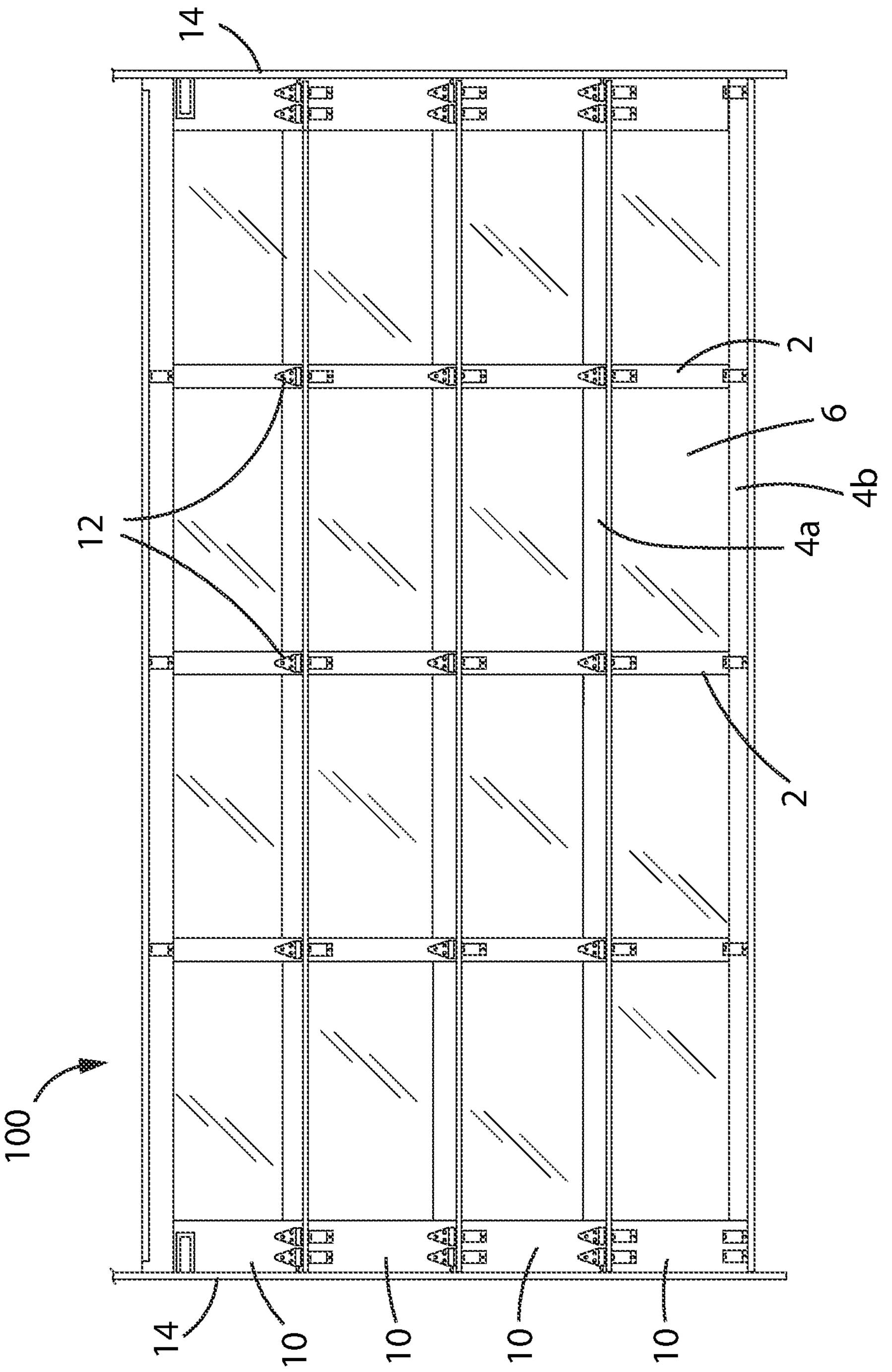
FIG. 1 is a elevational view of a sectional door according to an embodiment of the disclosure.

FIG. 1 shows a sectional door 100 according to embodiments of the disclosure. The door is formed from four sections 10, each running across the width of the door. A greater or fewer number of sections 10 can be use within the scope of the disclosure. Sections 10 are connected with one another by a plurality of hinges 12. The hinged connections allow the door 100 to bend so that it can be raised along tracks 14 on either edge of the door. An electric motor and control mechanism may be provided to raise and lower the door to open and close a doorway.

Each section 10 is formed by a top rail 4*a* and a bottom rail 4*b*. Rails 4*a*, 4*b* include one or more pulleys at their ends. These pulleys engage with tracks 14 to allow the door to be moved up and down.

Stiles 2 run vertically between the top 4*a* and bottom 4*b* rail on each section 10 of the door. In the embodiment shown in FIG. 1, each section 10 includes five stiles 2, one along each side of the door and three stiles intermediate the end stiles. In the embodiment shown in FIG. 1 this creates four openings on each section that hold glazing panels 6. Doors with a greater or fewer number of stiles, and hence with a greater or fewer number of openings holding glazing panels, can be provided within the scope of the disclosure. As will be discussed below, embodiments of the disclosure provide a glazing bead that transfers force exerted on glazing panels forming the door to the rails and that provided sufficient strength to the rails to transfer the exerted force to the walls surrounding the door 100 during severe weather events.

Figure 2:
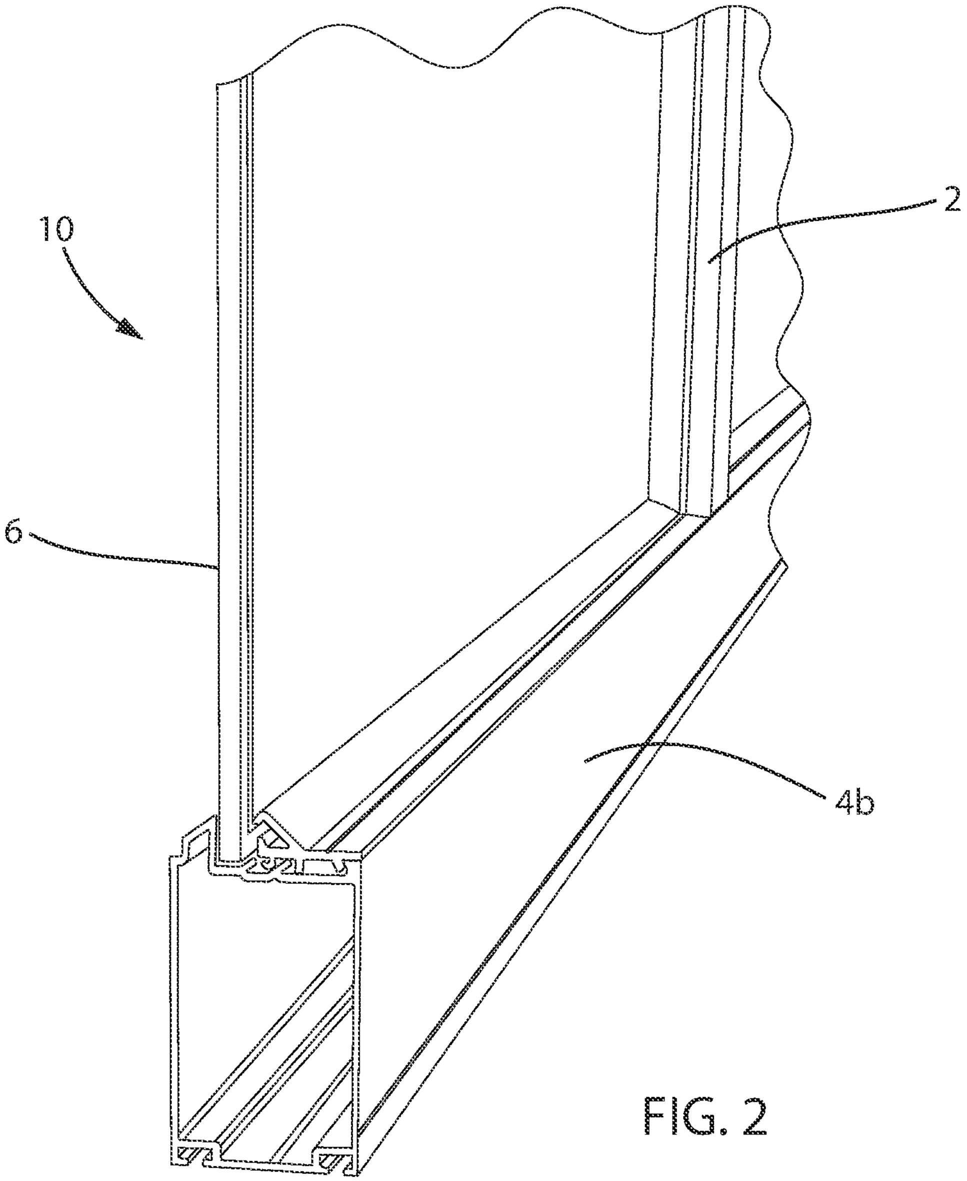
FIG. 2 is a partial cross-sectional view of a sectional door with glazing panels secured to the frame of the door with glazing beads according to an embodiment of the disclosure.

FIG. 2 shows a cross section of a portion of door section 10. Glazing panel 6 is supported by bottom rail 4*b* and stile 2. Glazing panel may be clear, translucent or opaque. According to some embodiments, panel 6 is formed from a clear, high-impact polymer such as polycarbonate.

For clarity of the description, the terms "frameward," "frame-facing," and "in a frameward direction" refer to the direction along the face of glazing panel 6 toward the frame formed by rails 4*a*, 4*b*, and stiles 2 surrounding the panel. The terms "panelward," "panel-facing," and "in a panelward direction" refer to the direction along the face of the glazing panel away from the frame surrounding the panel and toward the center of the panel.

Figure 3:
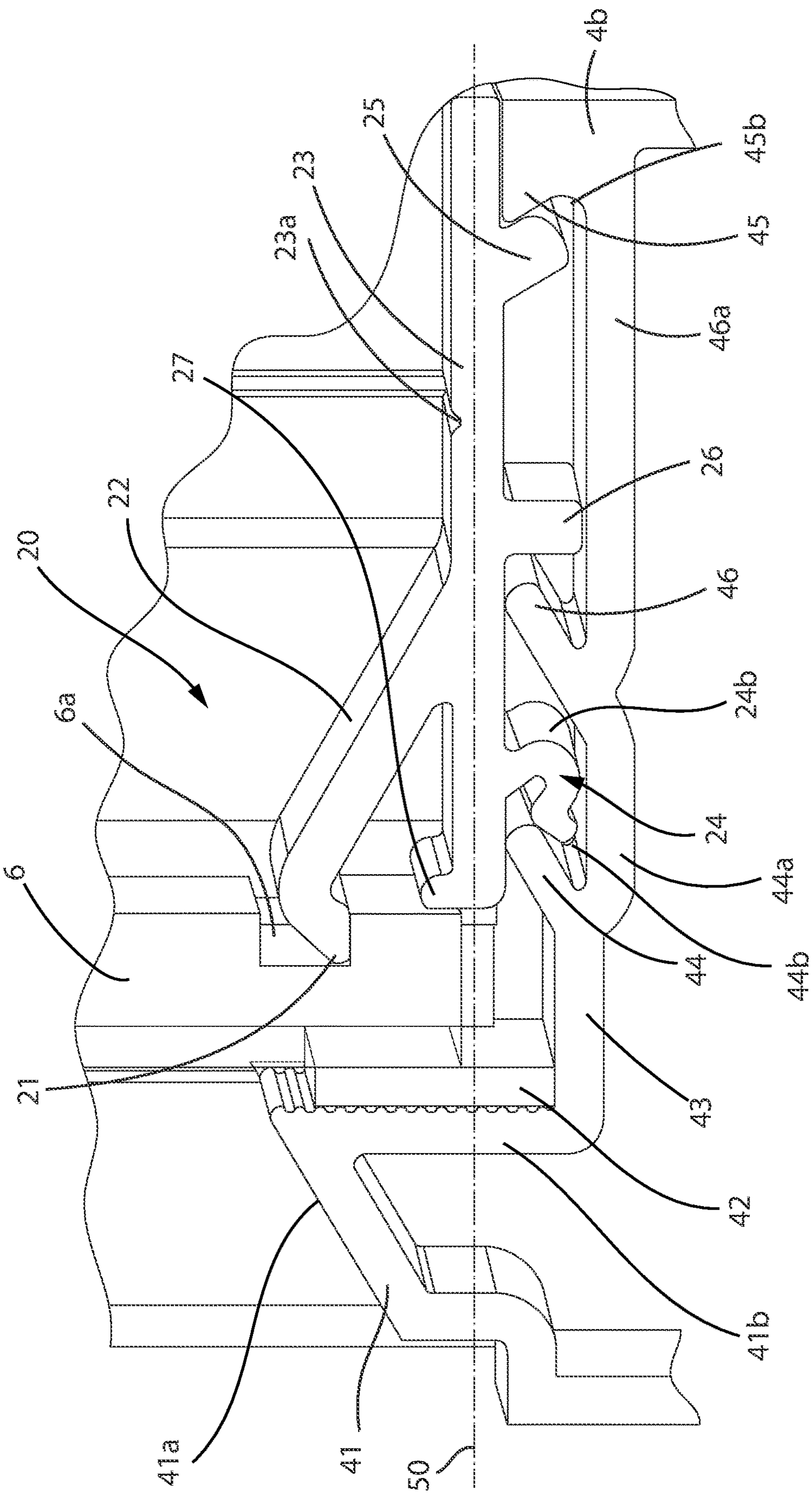
FIG. 3 is a detailed cross-sectional view of a glazing bead and door frame according to an embodiment of the disclosure.

FIG. 3 shows a detailed cross section of the engagement of panel 6 with bottom rail 4*b* using glazing bead 20 according to an embodiment of the disclosure. This same engagement is formed between panel 6 and the other components of section 10 that frame the opening holding panel 6, that is, the connections with top rail 4*a* at the top of the panel and stiles 2 on either side of the panel. These other components include the same structures as those described with respect to rail 4*b*. For the sake of brevity, embodiments of the disclosure will be described with respect to bottom rail 4*b* only.

Stop 41 is provided distal of glazing panel 6 near the outward face of rail 4*b*. According to this embodiment, stop 41 includes a sloped sill 41*a* outward from panel 6. The inward-facing part of stop 41 forms a sealing surface 41*b*. A seal 42 is provided against the sealing surface 41*b*. Seal 42 may a semi-solid material, such as glazer's putty or an elastomeric material such as foam glazer's tape. According to some embodiments, seal 42 is provided with pressure sensitive adhesive so that it can be easily fixed to sealing surface 41*b* as the door 100 is assembled. The outward facing surface of panel 6 contacts seal 42. Where seal 42 includes a contact adhesive on the side facing panel 6, this may simplify assembling the door by adhering panel in place while bead 20 is installed, as will be explained below.

A support surface 43 may be provided on rail 4*b*. Support surface 43 is spaced away from the edge of panel 6. In some embodiments, the edge of panel 6 is in contact with surface 43.

First engaging lip 44 and first receiving section 44*a* are located on rail 4*b* inward from (that is, proximal of) panel 6 and surface 43. First lip 44 slopes upward in the panelward direction from surface 43 and is spaced apart from first receiving section 44*a* by a first gap 44*b*. Intermediate lip 46 and intermediate receiving section 46*a* are located on rail 4*b* inward from (that is, proximal of) first lip 44 and first receiving section 44*a* is. Intermediate lip 46 slopes upward and away from rail 4*b* in the panelward direction. Second engaging lip 45 is provided toward the inward edge of rail 4*b* distal of intermediate lip 46. Second engaging lip 45 extends in the outward direction above intermediate receiving section 46*a*. A second gap 45*b* is provided between second lip and intermediate receiving section 46*a*.

Glazing bead 20 fixes glazing panel 6 with rail 4*b*. Body 23 of bead 20 extends along major axis 50. Panel engaging arm 22 of bead 20 extends in the panelward direction at a shallow angle with respect to axis 50. Panel engaging bar 21 is provided at the outward (distal) end of arm 22. Bar 21 fits into notch 6*a* of panel 6. Abutment 27 is positioned at the outward (distal) end of body 23 along major axis 50. Abutment 27 presses against the inward facing surface of panel 6. According to one embodiment, pressure of abutment 27 against panel 6 presses the panel against seal 42 and against sealing surface 41*b* of stop 41 to provide a weather-tight seal between rail 4*b* and panel 6.

First engagement extension 24 extends in the frameward direction from body 23 toward rail 4*b*. Extension 24 extends into first gap 44*b* and engages with the inward-facing surface of first lip 44. Second engagement extension 25 extends frameward from body 23 toward rail 4*b* and is positioned towards the inward-most (proximal) end of bead 20. Second extension 25 engages with second lip 45 and extends into the second gap 45*b* formed between second lip 45 and intermediate receiving section 46*a*.

According to some embodiments, first extension 24 resiliently deforms when bead 20 is engaged with rail 4*b*. Extension 24 may have a resilient portion 24*b* with curved or hook-shaped cross section to facilitate this resilient engagement. In some embodiments, the spring tension created as a result of this deformation presses first extension 24 in the outward direction so that first extension 24 is held in first gap 44*b* between first lip 44 and first receiving section 44*a*. The spring tension presses second extension 25 in the inward (proximal) direction so that second extension 25 is held in second gap 45*b* between second lip 45 and intermediate receiving section 46*a*. This arrangement holds bead 20 onto rail 4*b* and keeps abutment 27 pressed against panel 6.

Intermediate extension 26 on bead 20 extends from body 23 toward rail 4*b*. When bead 20 is engaged with rail 4*b*, intermediate extension 46 contacts intermediate receiving section 46*a*. Likewise, intermediate lip 46 extends panelward from rail 4*b* and may contact the bottom surface of body 23. Contact between the intermediate extension 26 and rail 4*b* and/or between the intermediate lip 46 and body 23 keep body 23 positioned so that major axis 50 of bead is perpendicular to the face of panel 6.

In the configuration shown in FIG. 3, force applied on the inside surface of panel 6 in the outward direction, for example, because door 100 is on the leeward side of the building during a storm event and experiences a suction force, will tend to drive panel 6 outward. Sealing surface 41*b* of stop 41 and seal 42 abutting the outer surface of panel 6 prevent the panel from blowing outward due to suction force. The force on panel 6 is transferred to rail 4*b*, and the other components of section 10 forming the frame around panel 6, i.e., top rail 4*a* and stiles 2.

Pressure on panel 6 directed inward, for example, when the door 100 is on the windward side of a building, as well as the force that panel may experience due to impact from wind-borne objects on the outside of the panel 6 are communicated to bottom rail 4*b* (as well as top rail 4*a* and stiles 2) by bead 20. Abutment 27 absorbs force directly inward along major axis 50. This force drives body 23 inward, pressing second extension 25 against second lip 45. Because both abutment 27 and extension 25 are along, or are very close to, major axis 50, this inward force is communicated from panel 6 to door section 10 and then to the tracks 14 along the wall of the building. Because the inwardly directed force is primarily along axis 50, very little torque is applied to bead 20. This reduces the tendence for bead 20 to be pulled away from rail 4*b* (and top rail 4*a*, and stiles 2 forming the door frame) during a storm event.

The edge of panel 6 is fixed by abutment 27 and sealing surface 41*b* of stop 41. Force applied to panel 6 in either the inward or outward direction may cause panel 6 to bow. Bowing of the panel 6 rotates the edge of panel 6 with respect to the fixed region created by the abutment 27 and stop 41*b*. This rotation will tend to pull the lower edge of notch 6*a* away from the frame (upward in the view of FIG. 3). Bar 21 engages with the frameward edge of notch 6*a* to limit how far the notched edge of the panel 6 can move away from the frame. This arrangement resists movement of the edges of panel 6 away from the frame in the frameward direction when the panel 6 bows in response to applied force. Panelward force communicated to bead 20 by arm 21 is resisted by engagement of first engagement extension 24 and first lip 44. Again, force exerted on panel 6 by a storm event is communicated from panel 6 to rail 4*b* (and likewise, rail 4*a* and stiles 2).

Embodiments of the disclosure are described with a glazing bead provided on the inward-facing side of the glazing panel. The disclosure is not limited to this arrangement and is also applicable to providing the glazing bead on the outward-facing surface of the glazing panel.

Figure 4A:
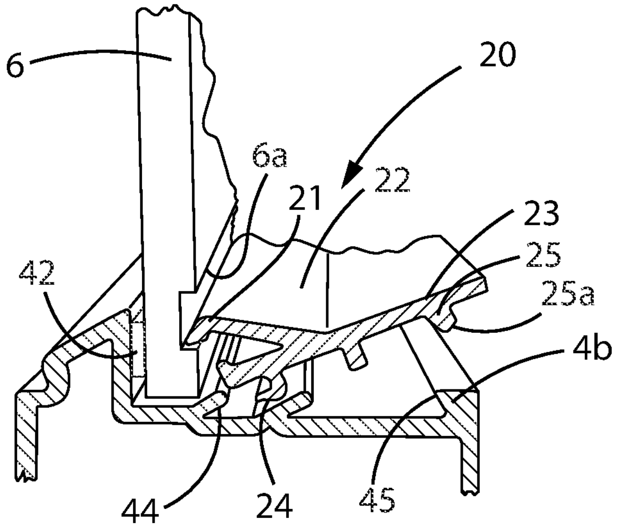
FIGS. 4A, 4B, and 4C are cross sectional views of the glazing bead and door frame of FIG. 3, with the bead readied for installation onto the frame.
Figure 4B:
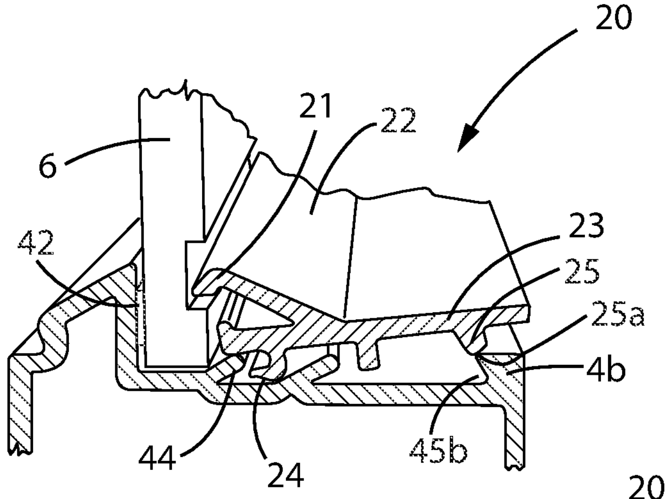
Figure 4C:
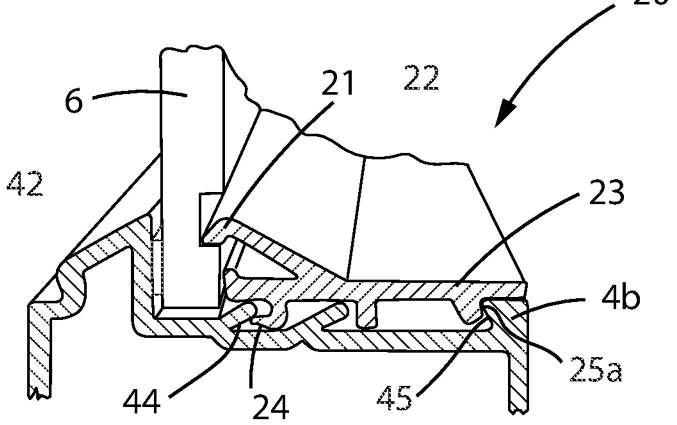

FIGS. 4A, 4B, and 4C show bead 20 as it is being connected with rail 4*b*. Panel 6 has been placed against seal 42 along sealing surface 41*b*. According to some embodiments, seal 42 has a pressure-sensitive adhesive coating that temporarily holds panel 6 in the frame until the bead 20 can be installed. As shown in FIG. 4A, bead 20 is positioned so that first extension 24 rests against the top of first lip 44. According to some embodiments. ramp 24*a* is provided at the end of extension 24 in contact with first lip 44 to facilitate the movement of extension 24 past the edge of lip 44. Second extension 25 rests against the top (i.e., panelward edge) of second lip 45. According to one embodiment, second extension 25 is provided with curved surface 25*a* that contacts the edge of lip 45 and facilitates the movement of second extension 25 past the edge of second lip 45. Distal end of arm 22 is inserted in notch 6*a* of panel 6.

While the bead 20 is positioned as shown in FIG. 4B, downward pressure, F, is applied to bead 20 in the frameward direction. This forces ramp 24*a* against first lip 44, causing extension 24 to flex away from lip 44. Surface 25*a* riding on the edge of lip 45 moves bead 20 in the outward direction. Once the point of contact between surface 25*a* and lip 45 passes the inward-most extension of surface 25*a* and once ramp 24*a* passes below the panelward end of first lip 44, the rebound of first extension 24 engages first extension 24 into the first gap 44*b* below first lip 44 and engages second extension 25 into the second gap 45*b* below second lip 45. Bead 20 is thus, secured with rail 4*b* by a snap-fit engagement, as shown in FIG. 4C. In this embodiment, no additional fasteners are required to secure panel 6 with rail 4*b*. This may allow door section 10 to be assembled more quickly than one using known glazing beads.

According to other embodiments, in addition to the resilient engagement between bead 20 and rail 4*a*, 4*b* and stile 2, additional fasteners may be provided to connect the bead to the rail or stile. For example, a fastener could be inserted through body 23 into rail 4*b*. According to one embodiment, notch 23*a* is provided in body 23 to guide the insertion of fasteners, such as self-tapping screws.

According to other embodiments, in addition to, or instead of fasteners connecting bead 20 with rails 4*a*, 4*b* and stiles 2, an adhesive is provided. According to one embodiment, a portion of adhesive is applied at one or more locations along each of the rails 4*a*, 4*b*, and stiles 2 surrounding panel 6. According to one embodiment, portions of adhesive are applied on the proximal sides of first lip 44 and intermediate lip 46. According to this embodiment, when bead 20 is installed, as shown in FIG. 3, the adhesive bonds first extension 24 with first lip 44 and bonds intermediate extension 26 with intermediate lip 46. According to a preferred embodiment, approximately 2-inch long portions of adhesive are applied to each of the rails 4*a*, 4*b* and stiles 2 near where the rails and stiles meet, that is, near the corners of panel 6 and at locations approximately central between the where the rails and stiles meet. The adhesive is may be any suitable adhesive that effectively bonds the materials forming the bead with the materials forming the rails and stiles. According to one embodiment, the adhesive is LOCTITE™ AA H8000.

Glazing bead 20 may be formed as an extrusion, with a continuous length cut to size to fit along rails 4*a*, 4*b*, and stiles 2. Glazing bead 20 may be formed from a metal, such as aluminum or a polymer such as high-density polyethylene.

Figure 5:
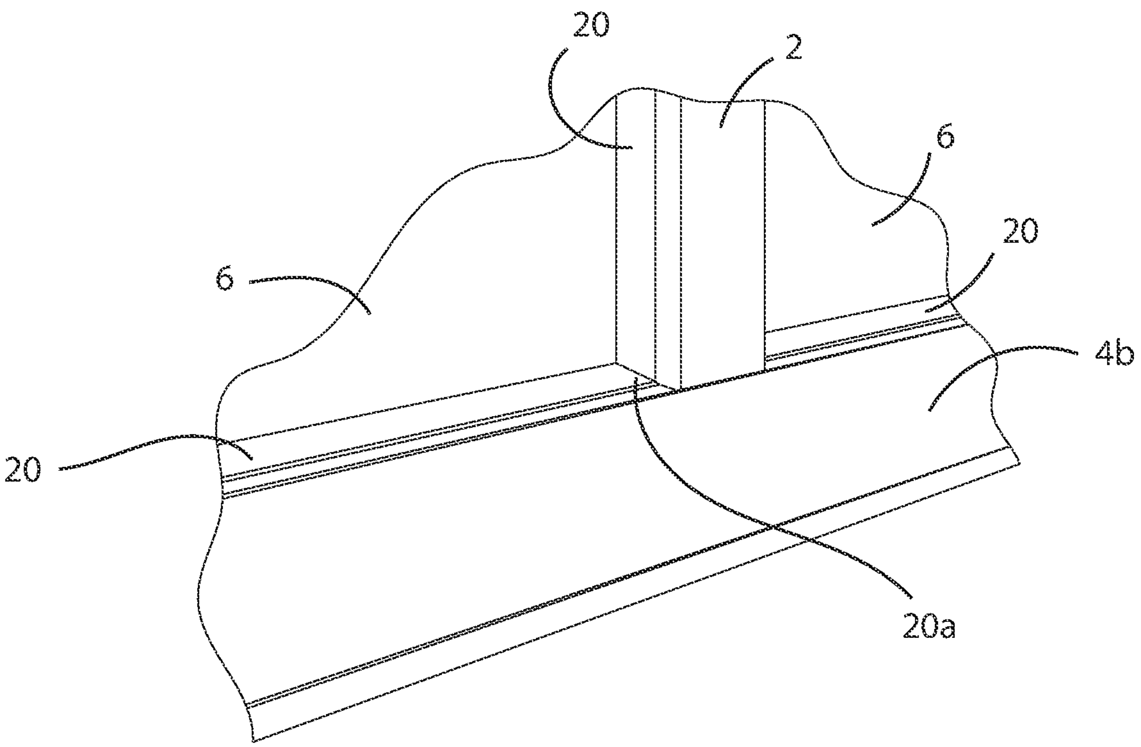
FIG. 5 is a perspective view of a portion of a sectional door including the bead and door frame of FIG. 3.

FIG. 5 shows a perspective view of a portion of door 100. In this view, two panels 6 are held within frames partially formed by rail 4*b* and stiles 2. Glazing beads 20 are connected with the rail and the stile, as described above. Ends of the beads 20 are mitered so that beads 20 connected with the stiles 2 join with beads 20 connected with rails 4*a*, 4*b* so that a tight joint 20*a* is formed at the corners of the panels 6.

Figure 6A:
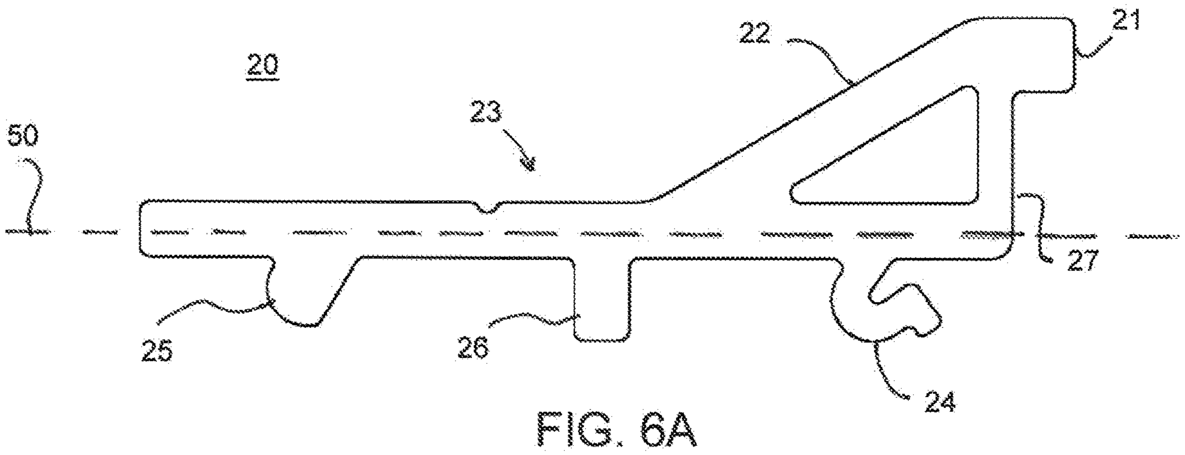
FIGS. 6A-F are cross sectional views of glazing beads according to additional embodiments of the disclosure.

FIGS. 6A-6F show other embodiments of bead 20 according to the disclosure. As shown in FIG. 6A, bead 20 includes a body 23 arranged along an axis 50. For each of the embodiments of FIGS. 6A-6F, first engaging extension 24, intermediate extension 26, and second engaging extension 25 extend from one side of body 23 and are adapted to engage with frame 4*a*, 4*b* and stiles 2 as discussed in previous embodiments.

In the embodiment shown in FIG. 6A, abutment 27 is joined with panel engaging arm 22 near panel engaging bar 21. Extending abutment 27 creates a larger abutting surface in contact with panel 6 as compared with the embodiment of FIG. 3 to distribute inwardly directed forces caused, for example, by objects impacting the panel during a storm event. The connection between bar 21 and abutment 27 may also stiffen engaging arm 22 to resist wind loads that may cause panel 6 to bow inward or outward by communicating panelward forces through abutment 27 to body 23 and then to the frame and stiles.

Figure 6B:
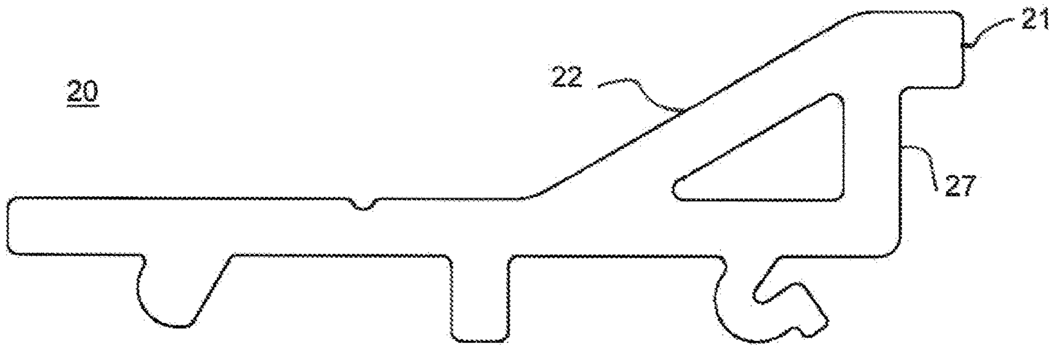

FIG. 6B shows an alternative embodiment of bead 20 where abutment 27 is thicker than the abutment in FIG. 6A. A thicker abutment 27 may increase the strength of the bead. The embodiments of FIGS. 6A and 6B include a hollow space between abutment 27, engaging arm 22, and body 23. This hollow space reduces the amount of material needed to form the bead, potentially reducing manufacturing costs.

Figure 6C:
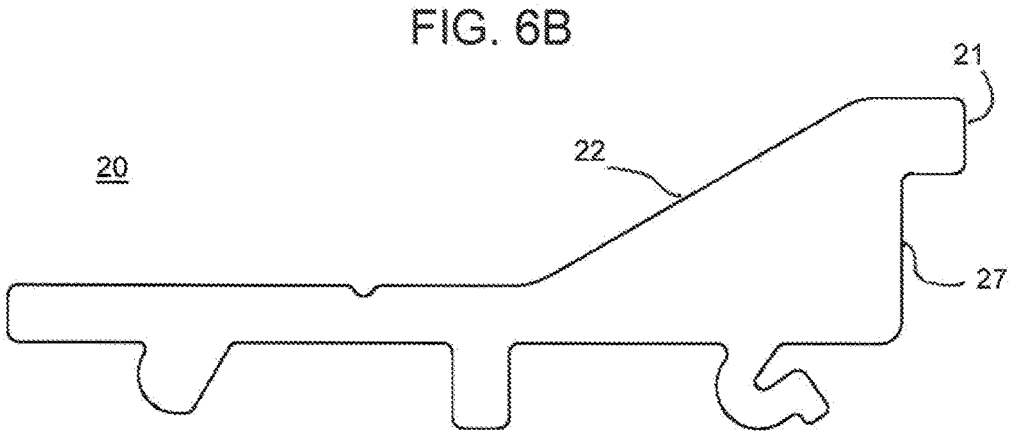

FIG. 6C shows yet another embodiment of bead 20. Here abutment 27 and arm 22 are formed as a solid structure at the distal end of body 23. Such an embodiment may further increase the strength of bead 20 to resist forces exerted by notch 6*a* in the panelward direction when the panel is subject to forces that cause the panel to bow outward or inward.

Figure 6D:
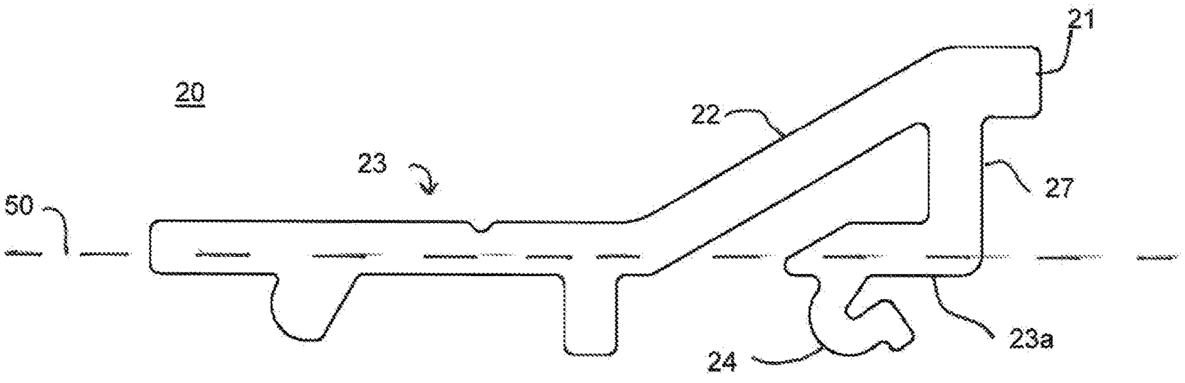

FIG. 6D shows yet another embodiment of bead 20. Instead of having a body 23 that extends continuously along axis 50, in this embodiment segment 23*a* joins abutment 27 with first extension 24. Segment 23*a* is separated from body 23 by a gap. Abutment 27 connects with engaging bar 21 and engaging arm 22. In this embodiment, force exerted by notch 6*a* in the panelward direction is communicated from bar 21, through abutment 27 and segment 23*a* to first extension 24, which engages the first lip 44 on the frame and stiles. The gap leads to an open channel between arm 22 and abutment 27. This open channel reduces the amount of material needed to form the bead 20, potentially reducing manufacturing costs.

Figure 6E:
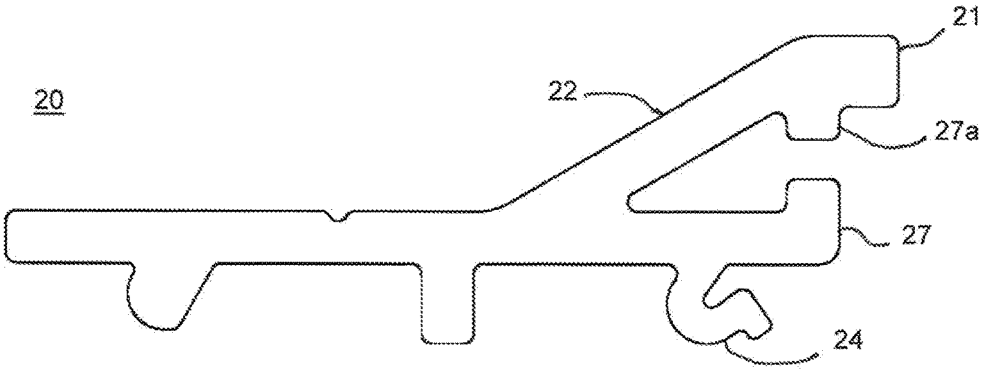
Figure 6F:
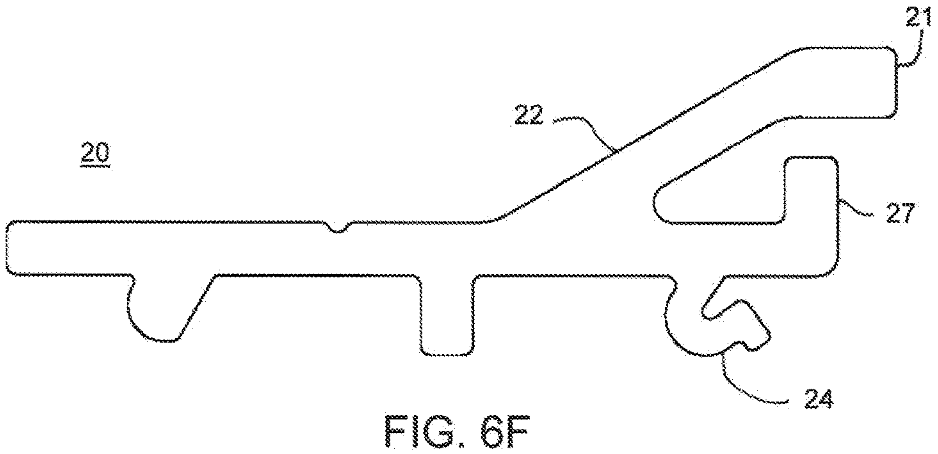

FIGS. 6E and 6F show additional embodiment of bead 20. These embodiments are similar to the ones discussed with respect to FIG. 3. Engaging bar 21 is connected with body 23 by engaging arm 22. Abutment 27 is provided at the distal end of body 23. In the embodiments of FIGS. 6E and 6F, abutment 27 is extended from body 23 farther than in the embodiment of FIG. 3, creating a larger contacting surface between abutment 27 and panel 6 to distribute inwardly directed loads from the panel to bead 20 and to the frame and stiles. In the embodiment of FIG. 6E, an additional abutment 27*a* extends from engaging arm 22 and provides additional surface area to distribute inwardly directed loads.

Figure 7:
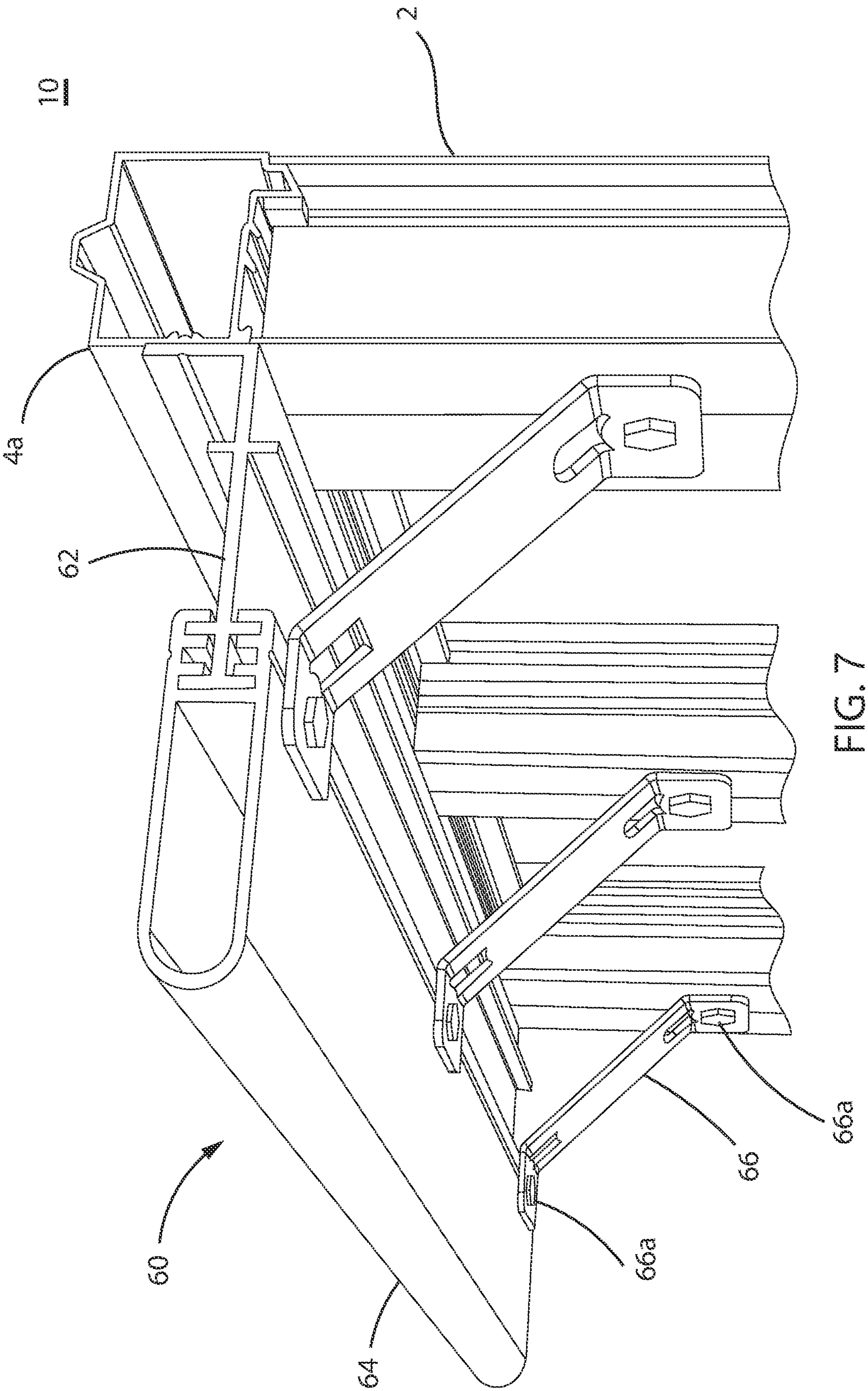
FIG. 7 is a perspective view of a portion of a sectional door with a reinforcement and endcap according to a further embodiment of the disclosure.
Figure 8:
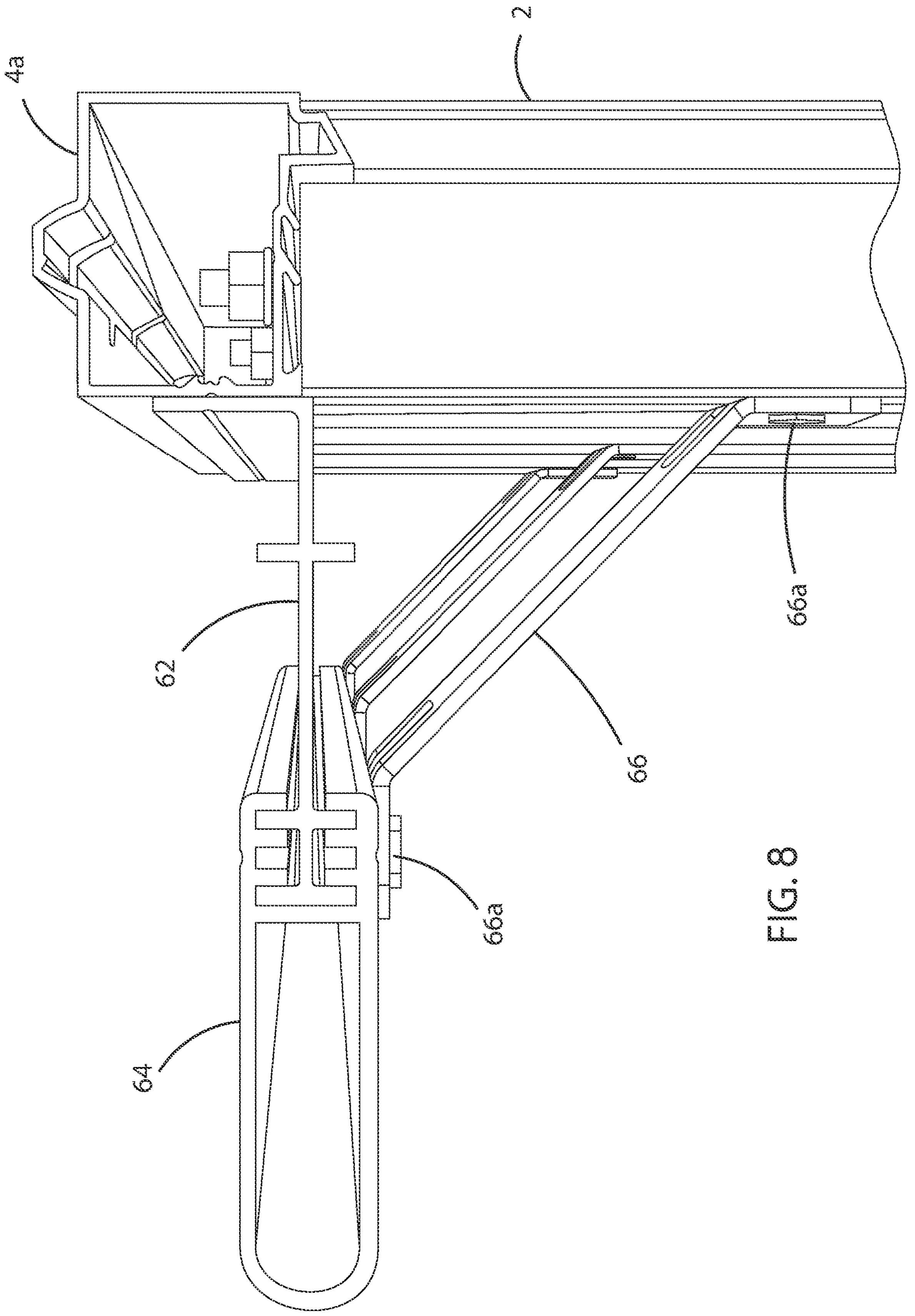
FIG. 8 is an elevation view of a sectional door including the reinforcement and endcap of FIG. 7.

FIGS. 7 and 8 show, respectively, a perspective view and an elevation view of another embodiment according to the disclosure. Door section 10 is provided with reinforcement 62. Reinforcement 62 is connected with one or more of rails 4*a*, 4*b*. Endcap 64 is connected with the inward-most (proximal) end of reinforcement 62. Brackets 66 connect endcap 64 with stiles 2. According to one embodiment, one or more fasteners 66*a* are provide at the ends of bracket 66 to connect the bracket with endcap 64 and stile 2. According to other embodiments, bracket 66 is connected with endcap 64 and stiles 2 by welding or other attachment method known to those of skill in the field of the invention.

Figure 9A:
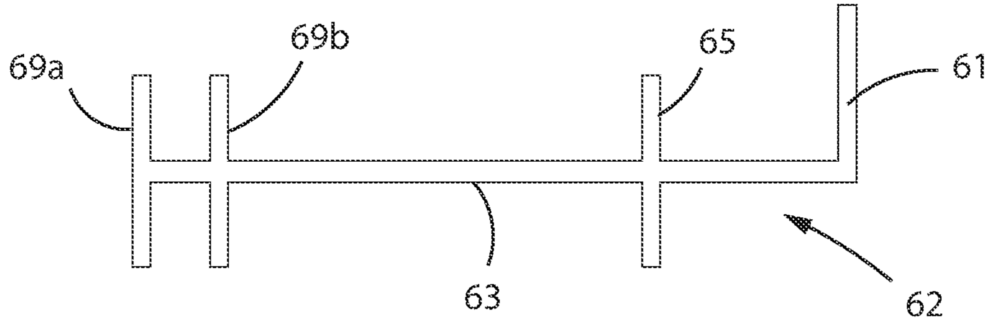
FIGS. 9A and 9B are cross-sectional views of the reinforcement and endcap, respectively, of FIG. 7.

FIG. 9A shows a cross section of reinforcement 62. Reinforcement 62 is formed by root 61. As will be explained below, root 61 connects reinforcement 62 with a rail 4*a*, 4*b* of door 100. Reinforcement body 63 extends from root 61. According to one embodiment, body 63 extends perpendicularly from root 61. End flanges 69*a* and 69*b* extend perpendicularly from body 63 and are spaced apart from one another by a gap. In this embodiment, two end flanges 69*a*, 69*b* are shown, but a greater or fewer number of flanges could be provided within the scope of the disclosure. According to an embodiment of the disclosure, intermediate flange 65 is provided on body 63 between root 61 and end flange 69*b*.

Figure 9B:
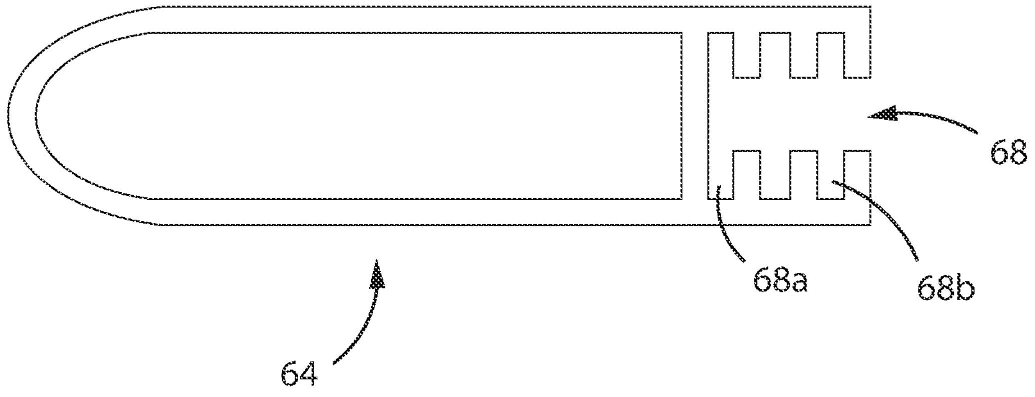

FIG. 9B shows a cross section of endcap 64. Connection portion 68 is provided along one edge of endcap 64. Connection portion 68 includes a plurality of gaps 68*a*, 68*b* that extend along the length of endcap 64. Gaps 68*a*, 68*b* are sized and positioned to correspond with the size and spacing of end flanges 69*a*, 69*b* on reinforcement 62.

Figure 10:
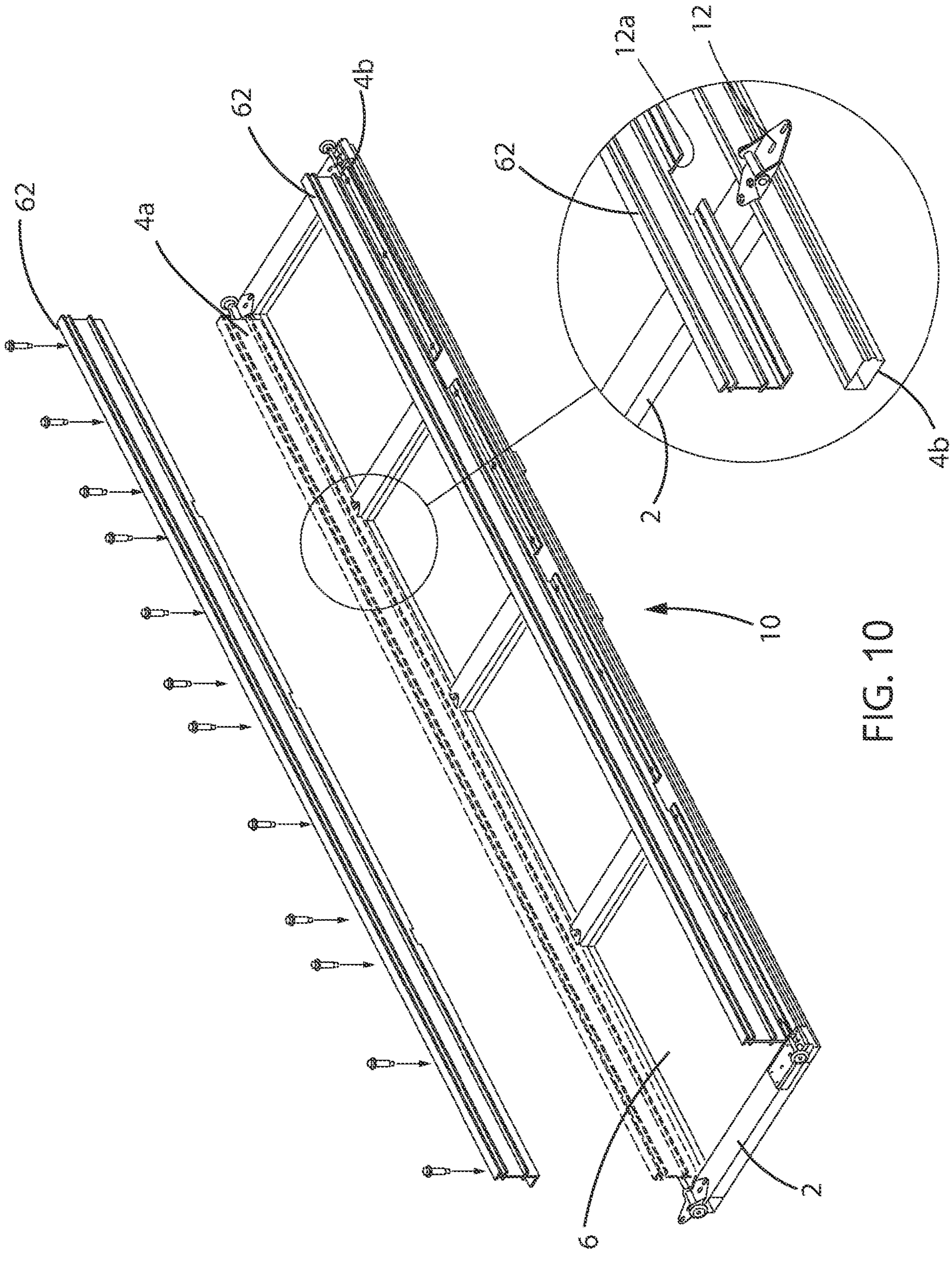
FIG. 10 is a perspective view of the reinforcement of FIG. 7 being connected with a sectional door.

FIG. 10 shows the attachment of reinforcement 62 with panel 10 of door 100. Reinforcement 62 is aligned with rail 4*a*, 4*b*. According to one embodiment, hinges 12 are provided along the edges of panel 10 aligned with stiles 2. The hinges 12 connect a plurality of panels 10 with one another to form door 100, as shown in FIG. 1. According to this embodiment reinforcement 62 includes notches 12*a* that align with hinges 12 to provide clearance between the hinges and the reinforcement. A plurality of fasteners, such as self-tapping screws, are driven through root 61 of reinforcement 62 and into rail 4*a*, 4*b* to join the reinforcement with the rail.

Figure 11A:
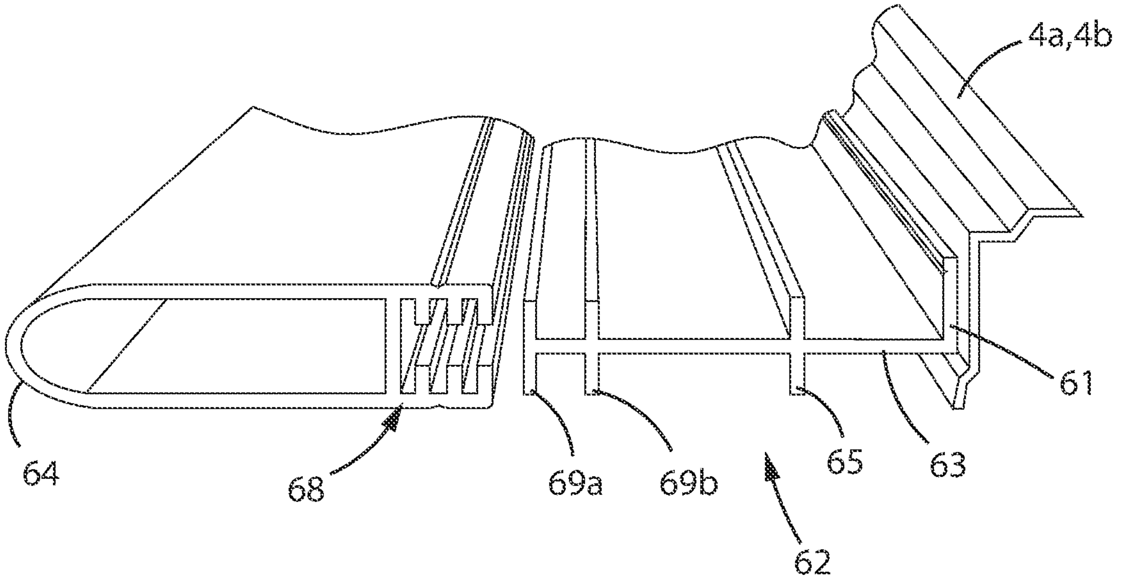
FIGS. 11A, 11B, and 11C are perspective views showing the connection of the endcap and reinforcement of FIG. 7 with one another.
Figure 11B:
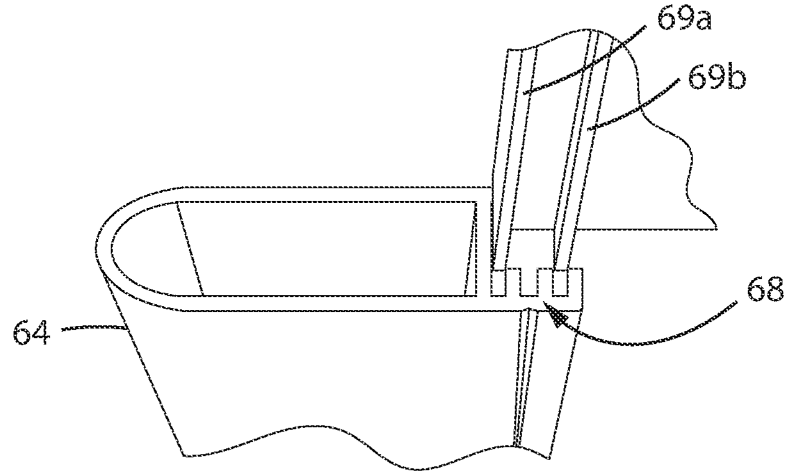
Figure 11C:
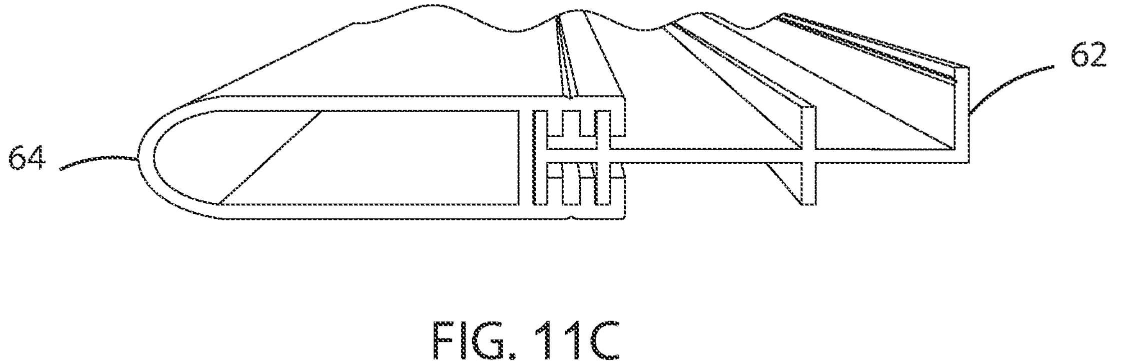

FIGS. 11A, 11B, and 11C show steps for connecting endcap 64 with reinforcement 62. As shown in FIG. 11A, reinforcement 62 is connected with rail 4*a*, 4*b* and endcap 64 is position parallel with reinforcement 62. As shown in FIG. 11B, end flanges 69*a*, 69*b* are aligned with gaps 68*a*, 68*b* of endcap 64. Endcap 64 slides onto reinforcement 62 with end flanges 69*a*, 69*b* engaged with gaps 68*a*, 68*b*. FIG. 11C shows reinforcement 62 fully engaged with endcap 64.

As shown in FIGS. 7 and 8, once reinforcements 62 are connected with the rails 4*a*, 4*b* of door panel 10 and endcap 64 is engaged with reinforcement 62, brackets 66 are provided. According to one embodiment, the top end of bracket 66 is connected with the underside of endcap 64 by a fastener, such as a self-tapping screw 66*a*. The screw is driven through the top end of the bracket 66, through the wall of endcap 64, and into the body 63 of reinforcement 62 between end flanges 69*a*, 69*b*. According to this embodiment, fasteners 66*a* serve to connect the bracket 66 with the endcap 64 and reinforcement 62 and also to fix the endcap and reinforcement with one another. Bottom end of bracket 66 is connected with stile 2 of door section 10 using, for example, a self-tapping screw. Bracket 66 provides support for reinforcement 62 and endcap 64.

According to one embodiment, reinforcement 62 increases the stiffness of rails 4*a*, 4*b* by increasing the mechanical moment of inertia of the rail where force is applied against the face door 100, for example, during a storm event when wind forces drive the door in the inward and outward direction. Endcap 64 further increases this moment of inertia, and hence, the stiffness of the door panel. The stiffened rails 4*a*, 4*b* transfer the force applied to the glazing panels to the tracks 14 connected with the walls surrounding the doorway.

While illustrative embodiments of the disclosure have been described and illustrated above, it should be understood that these are exemplary of the disclosure and are not to be considered as limiting. Additions, deletions, substitutions, and other modifications can be made without departing from the spirit or scope of the disclosure. Accordingly, the disclosure is not to be considered as limited by the foregoing description.

We claim:

1. A reinforced door, comprising:

a rail extending across a width of the door;

a reinforcement member arranged parallel with the rail, wherein the reinforcement member extends along the rail at least partially across the width of the door, and wherein the reinforcement member comprises:

a body, wherein the body defines a plane with a first edge and second edge;

a root extending from the body, wherein the root connects the body with the rail, wherein the root extends in a longitudinal direction along the first edge; and one or more end flanges extending in the longitudinal direction along or proximate to the second edge of the body, wherein the second edge is opposite the first edge, and wherein the root and the one or more end flanges extend perpendicular to the plane;

an endcap connected with the second edge of the reinforcement member and arranged parallel with the reinforcement member, wherein the endcap comprises a plurality of gaps along a first edge of the endcap, wherein the end flanges of the reinforcement member are received into the gaps to connect the endcap with the reinforcement member.

2. The reinforced door of claim 1, wherein the body defines a plane along the longitudinal direction and wherein the root and the one or more end flanges extend perpendicular to the plane.

3. The reinforced door of claim 1, further comprising one or more intermediate flanges extending perpendicular to the plane and positioned along the body between the root and the one or more end flanges.

4. The reinforced door of claim 3, wherein the one or more end flanges comprise two end flanges, wherein the two end flanges define a gap, and wherein the gap extends along the longitudinal direction parallel with the second edge.

5. The reinforced door of claim 4, wherein the end cap comprises two slots proximate to the proximal edge, wherein the slots are arranged to accept insertion of the two end flanges, and wherein when the two end flanges are inserted into the slots, the end cap is connected with the body.

6. The reinforced door of claim 5, wherein the end cap further comprises an internal cavity distal of the proximal edge.

7. The reinforced door of claim 1, wherein a plurality of fasteners extend through the root and into the rail to fix the body with the rail.

8. The reinforced door of claim 7, wherein the root comprises a notch extending in the longitudinal direction, wherein the notch facilitates insertion of the fasteners through the root.

9. The reinforced door of claim 1, further comprising one or more brackets and a plurality of fasteners, wherein a first end the bracket is secured with the member by a first fastener extending through the bracket, through at least one surface of the end cap, and through the body and wherein a second end of the bracket is connected with the door by a second fastener extending through the bracket and into a stile of the door.

10. The reinforced door of claim 1, further comprising:

a stile connected with the rail and extending perpendicular to the longitudinal direction in a plane of the door;

a bracket; and a plurality of fasteners, wherein a first end the bracket is secured with the reinforcement member by a first fastener extending through the bracket, through at least one surface of the end cap, and through the body of the member and wherein a second end of the bracket is connected with the panel by a second fastener extending through the bracket and into the stile.

11. The reinforced door of claim 10, further comprising a second rail, wherein the stile further comprises a plurality of stiles, wherein the stiles extend between the rail and the second rail to define one or more openings.

12. The reinforced door of claim 11, wherein the one or more openings comprise a glazing panel and wherein the glazing panel is fixed to the plurality of stiles, the rail, and the second rail by a glazing bead.

* * * * *